(12) United States Patent
Viswanathan

(10) Patent No.: US 7,179,404 B1
(45) Date of Patent: Feb. 20, 2007

(54) CORROSION PREVENTION OF COLD ROLLED STEEL USING WATER DISPERSIBLE LIGNOSULFONIC ACID DOPED POLYANILINE

(75) Inventor: Tito Viswanathan, Little Rock, AR (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/215,205

(22) Filed: Aug. 26, 2005

Related U.S. Application Data

(62) Division of application No. 09/903,260, filed on Jul. 11, 2001, now Pat. No. 6,972,098.

(60) Provisional application No. 60/217,493, filed on Jul. 11, 2000.

(51) Int. Cl.
*H01B 1/12* (2006.01)

(52) U.S. Cl. ..................... 252/500; 528/422

(58) Field of Classification Search ........... 252/500; 528/422
See application file for complete search history.

(56) References Cited

U.S. PATENT DOCUMENTS

| | | | |
|---|---|---|---|
| 5,968,417 A * | 10/1999 | Viswanathan | 252/500 |
| 5,976,419 A * | 11/1999 | Hawkins et al. | 252/512 |
| 6,440,332 B1 * | 8/2002 | Geer et al. | 252/512 |
| 6,764,617 B1 * | 7/2004 | Viswanathan et al. | 252/500 |

OTHER PUBLICATIONS

Berry et al (Corrosion Prevention of Cold Rolled Steel . . . ) Polymer Preprints, 2000, 41(2), May 16, 2000.*

* cited by examiner

*Primary Examiner*—Mark Kopec
(74) *Attorney, Agent, or Firm*—Randall M. Heald

(57) ABSTRACT

The invention provides coatings useful for preventing corrosion of metals. The coatings comprise a film-forming resin and conductive polymers comprising linearly conjugated π-systems and residues of sulfonated lignin or a sulfonated polyflavonoid or derivatives of solfonated lignin or a sulfonated polyflavonoid. The invention also provides a latex formulation of the coatings, and articles of manufacture comprising a metal substrate and a coating in contact with the metal substrate.

12 Claims, 2 Drawing Sheets

CORROSION PREVENTION OF COLD ROLLED STEEL USING WATER DISPERSIBLE LIGNOSULFONIC ACID DOPED POLYANILINE

PRIORITY OF INVENTION

This application claims priority under 35 U.S.C. § 119(e) from U.S. Provisional Patent Application Number 60/217,493 filed 11 Jul. 2001.

This application is a divisional application of U.S. patent application Ser. No. 09/903,260 filed Jul. 11, 2001, now U.S. Pat. No. 6,972,098, the contents of which are incorporated herein by reference.

GOVERNMENT FUNDING

The invention described herein was made in the performance of work under a NASA contract and is subject to the provisions of Public Law 96-517 (35 U.S.C. §202) in which the contractor has elected not to retain title.

BACKGROUND OF THE INVENTION

Polyaniline is an intrinsically conductive polymer (ICP) that has the potential to be used in a number of applications, such as LEDs, rechargeable batteries, EMI shielding, and smart windows. Another significant potential use is in the area of corrosion prevention. Corrosion is an estimated 200 billion dollar problem in the U.S. each year.

It has been found that polyaniline, can inhibit corrosion when applied to a metal surface. Conventional polyaniline, however, is limited by its processability (Gregory, Richard V., "Chapter 18: Solution Processing of Conductive Polymers: Fibers and Gels from Emerldine Base Polyaniline" in *Handbook of Conducting Polymers*, Eds. Skotheim, Terje A. et al., p. 437 (1998)). Emeraldine base, the nonprotonated, nonconducting form of polyaniline, has only limited solubility in organic solvents such as NMP, N,N-dimethylacetamide, and dimethylformamide. The doped conducting form, emeraldine salt, is insoluble in all common organic and polar solvents. The limited solubility of polyaniline makes it difficult to process and difficult to disperse evenly over a surface as a coating.

Lignosulfonic acid-doped polyaniline (hereinafter, ligno-pani; U.S. Pat. No. 5,968,417) is dispersible in water and fairly soluble in organic solvents such as dimethylsulfoxide (DMSO) and tetrahydrofuran (THF) in its conducting state due to the high solubility of the lignin (Viswanathan, T., U.S. Pat. No. 5,968,417; Sudhaker, M. et al., "Chapter 6: Conducting Waterborne Lignosulfonic Acid-Doped Polyaniline," in *Semiconducting Polymers*, Eds. Hsieh, Bing R. et al., American Chemical Society, p. 76 (1999)). This provides increased processability as well as reduced cost for this polymer. It has been disclosed that ligno-pani can be used to coat fabrics (Viswanathan, U.S. Pat. Nos. 5,968,417 and 6,059,999).

There is currently a need for corrosion-preventing coatings. In particular, with increasing restrictions by the EPA on Volatile Organic Compounds (VOCs), chromate, and other heavy metal conversion coatings, alternative additives for corrosion inhibition which can be dispersed in water-based coatings are of increasing importance. Thus, preferred metal coatings would have the properties of being inexpensive, water-based, and avoid the use of volatile organic compounds and heavy metals.

SUMMARY OF THE INVENTION

The present invention is directed to coating systems utilizing at least one inherently conductive polymer dispersed in a film-forming resin base, where the conductive polymer comprises (1) linearly conjugated B-systems and (2) residues of sulfonated lignin or a sulfonated polyflavonoid, or a derivative of sulfonated lignin or sulfonated polyflavonoid.

The invention provides an article of manufacture comprising a metal substrate and a coating in contact with the metal substrate, wherein the coating comprises: (1) linearly conjugated $\pi$-systems; (2) residues of sulfonated lignin or a sulfonated polyflavonoid or derivatives of sulfonated lignin or a sulfonated polyflavonoid; and (3) a film-forming resin.

The invention further provides a latex formulation comprising: (a) linearly conjugated $\pi$-systems, (b) residues of sulfonated lignin or a sulfonated polyflavonoid or derivatives of sulfonated lignin or a sulfonated polyflavonoid; and (c) a film-forming resin.

The invention further provides a composition for coating a metal, comprising: (a) linearly conjugated $\pi$-systems, (b) residues of sulfonated lignin or a sulfonated polyflavonoid or derivatives of sulfonated lignin or a sulfonated polyflavonoid; and (c) a film-forming resin other than a formaldehyde-based resin.

The invention further provides a method of protecting a metallic substrate from corrosion, comprising: (1) contacting the substrate with a coating composition comprising: (a) linearly conjugated $\pi$-systems, (b) residues of sulfonated lignin or a sulfonated polyflavonoid or derivatives of sulfonated lignin or a sulfonated polyflavonoid; and (c) a film-forming resin; and (2) curing the coating composition to form a corrosion resistant coating on the substrate.

DETAILED DESCRIPTION

Figure 1:
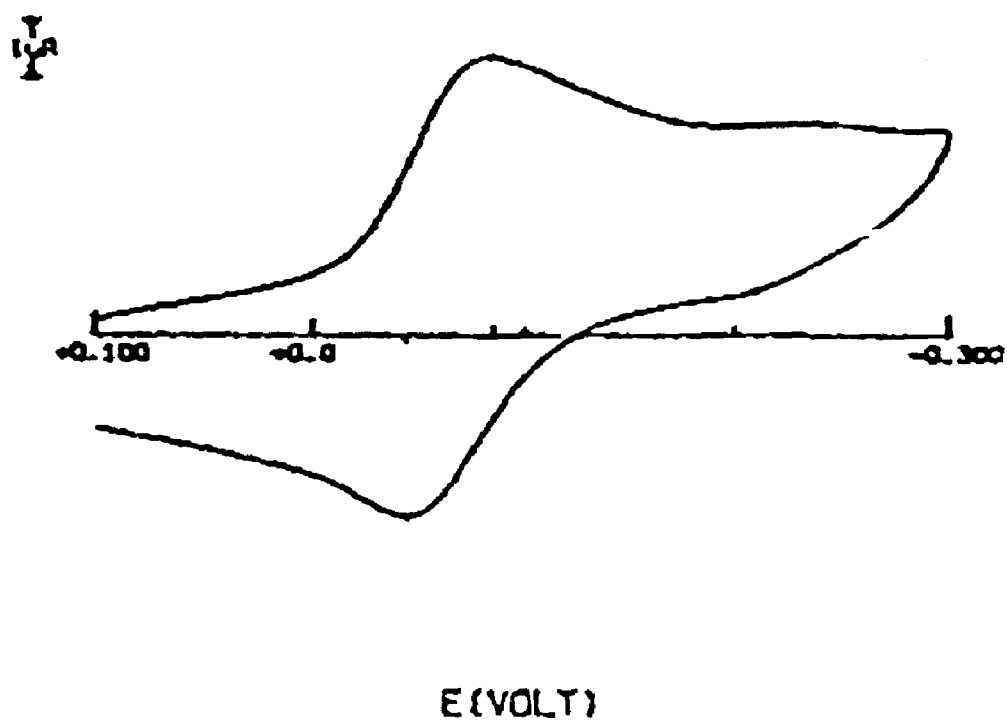
FIG. 1 shows the cyclic voltammogram (CV) of ligno-pani in 1.0 M $KNO_3$ vs. SSCE.

The present invention concerns a coating for ferrous or nonferrous metal substrates. The coating includes inherently conductive polymers dispersed in the coating matrix.

It has been found surprisingly that compositions comprising conducting polymers comprised of (1) linearly conjugated $\pi$-systems and (2) sulfonated lignin or a sulfonated polyflavonoid or derivatives of sulfonated lignin or sulfonated polyflavonoid, in coatings provide corrosion protection when applied to metal surfaces. The conducting polymers described herein are dispersible in coatings and provide more structure in coatings than the component monomers of the linearly conjugated $\pi$-systems would. In addition, the linearly conjugated $\pi$-systems reversibly oxidize in air, allowing them to regenerate as oxidants in the coatings.

The term "derivatives of sulfonated lignin or sulfonated polyflavonoid" as used herein encompasses derivatives that do not substantially alter the properties of the resultant conducting polymers used in the coatings, including the properties of electrical conductivity and solubility in water or another solvent used in the coating composition. The derivatives may, however, have small effects on the properties of the conducting polymers. Suitable derivatives, for example, may contain one or more hydroxy, methoxy, ethoxy, hydroxymethyl, or 2-hydroxyethoxy substituents.

The field of electrically conducting organic polymers is dominated by two types of molecular structures: linear conjugated B-systems and charge-transfer complexes, which form stacks of B-systems in the solid state. In linear conjugated B-systems, electrons move rapidly along a partially oxidized or reduced molecular chain. The conjugated region of an individual linearly conjugated B-system should preferably extend so that when the conjugated region of one linearly conjugated B-system is adjacent to the conjugated region of another linearly conjugated B-system, and an electric field is applied, an electron can flow from the first linearly conjugated B-system to the adjacent linearly conjugated B-system.

Examples of linear conjugated B-systems include polymers comprising substituted and unsubstituted aromatic and heteroaromatic rings (e.g. 5 or 6 membered aromatic and heteroaromatic rings). Preferably, the rings will be linked into a continuous conjugated B-electron network, such as those present in polyaromatic or poly(pseudo-aromatic)systems. For example, see U.S. Pat. No. 5,423,956 at columns 1, 4, and inter alia.

Specific linearly conjugated B-systems comprise one or more conjugated regions composed of monomeric units incorporating a conjugated "basic atom" that can form the positive part of an ionic couple. The preferred basic atom is nitrogen. Other basic atoms include sulfur. For example, linearly conjugated B-systems can be composed entirely of, or comprise, repeating monomer units of aniline, thiophene, pyrrole, and/or phenyl mercaptan. Linearly conjugated B-systems useful in the present invention also include linearly conjugated B-systems of repeating monomer units of aniline, thiophene, pyrrole, and/or phenyl mercaptan that are ring-substituted with one or more (e.g. 1, 2, or 3) straight or branched alkyl, alkoxy, or alkoxyalkyl groups, wherein the alkyl, alkoxy, or alkoxyalkyl groups each contain from 1 up to about 10 carbon atoms, or preferably from 1 to 4 carbon atoms. Linearly conjugated B-systems that can be prepared by oxidation-type polymerization are preferred.

The linearly conjugated B-systems of the compositions of matter of the present invention can also be copolymers of any one or more of the above monomers with other co-monomers having ethylenic unsaturation, such as, ethylene, propylene, vinyl chloride, styrene, vinyl alcohol, or vinyl acetate. In such cases, the conjugated region or regions containing the basic monomeric units should comprise a block sufficiently long that the composition of matter is conductive.

A linearly conjugated B-system can comprise 3 to 100 monomer units. Preferred linearly conjugated B-systems comprise 5 to 50 monomer units, and more preferred linearly conjugated B-systems comprise 10 to 30 monomer units.

One preferred class of linearly conjugated B-systems is the polyanilines. Polyanilines have been extensively studied because of their unique chemical, electronic, and optical properties. Thus, the polyanilines represent a well known class of substances in the polymer field. For a detailed description of polyanilines, see U.S. Pat. No. 5,164,465, columns 1–3. The linearly conjugated B-systems of the composition of matter of the invention are preferably polyaniline chains. Other preferred classes of linearly conjugated B-systems are the polypyrroles (A. F. Diaz et al. *J. Chem Soc. Chem. Commun.*, 1979, 635, 854; and G. Tourilion et al. *J. Phys. Chem.*, 1987, 87, 2289), and the polythiophenes (G. Tourilion *J. Electroanal. Chem.* 1984, 161, 51).

Lignin is a principal constituent of the wood structure of higher plants, and ranks second to cellulose as the most abundant organic material. Lignin from coniferous trees is a polymeric substance resulting from the random combination of the products of an enzymatically induced oxidation (dehydrogenation) of coniferyl alcohol. In deciduous trees, lignin comprises structures from the polymerization of both coniferyl alcohol and sinapyl alcohol. Additionally, the lignin polymer may comprise functional groups such as hydroxy, methoxy, and carboxy groups. See "Kirk-Othmer Concise Encyclopedia of Chemical Technology;" A Wiley-Interscience publication; 1985; page 699; Abridged version of the 24 volume Encyclopedia of Chemical Technology. 3rd ed. New York: Wiley, ©1978–©1984; executive editor Martin Grayson.

The sulfite process of the paper and wood-pulp industries yields a spent liquor that comprises sulfonated lignins (i.e. lignosulfonates). Lignosulfonates are used as dispersants, binders, emulsion stabilizers, complexing agents, and for other applications. Lignosulfonates are abundant, inexpensive polyaryl-sulfonic acids that are highly soluble in water. The aryl rings of lignosulfonate polymers may comprise a variety of functional groups (e.g. hydroxy, methoxy and carboxy groups) that can be cross-linked, after polymerization. Additionally, lignosulfonates comprise multiple sulfonic acid groups that can be used for doping polymers. Lignosulfonates can also be readily converted into their corresponding sulfonic acid derivatives, which are disclosed herein to be useful templates and reagents for oxidative polymerization reactions.

Lignosulfonates are available from a number of commercial sources. In general, lignosulfonates from any source can be used to prepare the coating compositions of the invention provided they are free of impurities that interfere with polymerization reaction conditions. Specifically, "Lignosulfonic acid, ethoxylated, sodium salt (CAS Regitry Number 68611-14-3, "REAX 825E")," available as REAX 825E from Westvaco, Chemical Division, Polychemicals Department, P.O. Box 70848, Charleston Heights, S.C. 29415-0848, can be used to prepare the compositions of matter of the invention. REAX 825E has the chemical formula: $[(CH_3O)(HOC_2H_4O)Ar(CH_2SO_3Na)_x(C_3H_5SO_3Na)_y]_z$. "Ammonium Lignosulfonate; WANIN AM (Powder) (CAS Registry Number 8061-53-8, "WANIN")" available from LIGNOTECH USA, INC., Research and Development. 100 Highway 51 South, Rothchild, Wis., 54474-1198, can also conveniently be used to prepare the compositions of matter of the invention.

Another class of polyaryl-sulfonic acids that are readily available and highly water soluble are the sulfonated polyflavanoids (e.g. sulfonated condensed tannins). Condensed tannins are used extensively in the commercial preparation of adhesives and resins (Wood Adhesives: Chemistry and Technology; A. Pizzi; Marcel Dekker, Inc., New York, (1983), chapter 4). Sulfonated polyflavonoids such as sulfonated tannins comprise polyaryl rings that comprise a variety of functional groups that can be cross-linked after polymerization. In particular, sulfonated polyflavonoids have a polyhydroxylated-sulfonated-polyaryl ring structure that make them ideal templates and reagents for preparing the compositions of matter of the invention.

The sulfonated lignins and sulfonated polyflavonoids share common structural features that make them especially useful for preparing the compositions of matter of the invention. It is understood that preferred reagents for preparing the compositions of matter of the invention comprise substituted sulfonated polyaryl rings. Thus, it is understood that, in general, sulfonated-polyaryl compounds, wherein the aryl rings are substituted with hydroxy, methoxy, ethoxy, hydroxymethyl, or 2-hydroxyethoxy substituents can be used as a templates or reagents for preparing the conductive polymer compositions.

Within the compositions of matter of the invention, the sulfonated polyaryl compounds (e.g. the sulfonated lignins or sulfonated polyflavonoids) can be attached to the linearly conjugated B-systems by ionic or covalent bonds, as well as through electrostatic interactions (e.g. hydrogen bonds). Thus, the term "residue of," as used herein with respect to a sulfonated polyaryl compound, comprises a radical and/or an ion of the sulfonated polyaryl compound that is attached (ionically, covalently, or electrostatically), at one or multiple sites, to one or more linearly conjugated B-systems.

The molecular weight of the conductive polymers incorporated in the coatings of the present invention can vary over a large range and may be virtually any value, depending on the desired application. Thus, the conductive polymers in the coatings of the invention may have a molecular weight on the order of about 5000 to 200,000. Specific conductive polymers in the coatings of the invention may have a molecular weight on the order of about 10,000 to 100,000; and preferred conductive polymers have a molecular weight of about 15,000 to 50,000.

The preparation of the conductive polymers of the invention can conveniently be carried out by combining a sulfonated lignin or a sulfonated polyflavonoid, with the desired monomer (or co-monomers), an effective amount of an initiator, and a solvent.

The monomer can be selected with regard to the desired final polymer. Suitable monomers include aniline, o-ethylaniline, m-ethylaniline, o-ethoxyaniline, m-butylaniline, m-hexylaniline, m-octylaniline, 4-bromoaniline, 2-bromoaniline, 3-bromoaniline, 3-acetamidoaniline, 4-acetamidoaniline, 5-chloro-2-methoxyaniline, 5-chloro-2-ethoxyaniline, 2,5-dimethylaniline, 2,3-dimethylaniline, 2,5-dibutylaniline, 2,5-dimethoxyaniline, tetrahydronaphthylamine, 2-cyanoaniline, 2-thiomethylaniline, 3-(n-butanesulfonic acid)aniline, 2,4-dimethoxyaniline, 4-mercaptoaniline, 4-methylthioaniline, 3-phenoxyaniline, 4-phenoxyaniline, thiophene, pyrrole, and thiophenol. Preferred monomers useful in the methods of the invention include aniline, o-methoxyaniline, and o-ethoxyaniline. Another preferred monomer is pyrrole.

Suitable solvents include polar liquids in which the lignosulfonic acid or sulfonated polyflavonoid or derivatives thereof, the monomer, and the final conductive polymers are soluble. Examples of suitable solvents include water or alkanols (e.g. methanol, ethanol, propanol, and isopropanol), dimethylsulfoxide, tetrahydrofuran, dimethyl formamide, N,N-dimethylacetamide, NMP, or any combination thereof. A preferred solvent is water. Suitable initiators include any material capable of initiating the oxidation polymerization, for example, hydrogen peroxide, iron trichloride, potassium permanganate, potassium persulfate, and other such oxidizing agents. When the monomer to be polymerized is an aniline, the preferred initiator is ammonium persulfate.

The polymerization reactions can be carried out at a suitable temperature for example, a temperature in the range of about −10 to 100 EC. Preferably, the polymerization is carried out at a temperature in the range of about 0 to 30 EC, and more preferably, at about 0 to 5 EC.

The polymerization reaction can conveniently be carried out using monomers and sulfonated aryl polymers in a wide range of weight ratios. Conveniently, approximately a (1–5):1 weight ratio of sulfonated aryl polymer and monomer can be used (e.g. a 1:1 ratio). However, for the preparation of the composition of matter comprising lignosulfonic acid and polyaniline chains, higher conductivities were obtained when lignosulfonic acid and aniline were combined in a 0.125:1 weight ratio. It may be preferred to carry out the polymerization reaction using about, a (0.01–1):1, or preferably about a (0.1–0.5):1, weight ratio of lignosulfonic acid to monomer. In general, the higher the relative concentration of lignosulfonic acid, the greater the dispersability of the resulting composition of matter.

Sulfonated lignin and sulfonated polyflavonoids are useful templates for carrying out polymerization reactions yielding conducting composition of matters comprising conjugated B-systems. Sulfonated lignin and sulfonated polyflavonoids are superior to other polymerization templates due to their very high solubility in water, their cross-linkability, their relative abundance, their low cost, and because of the availability of the pendent sulfonic acid groups for doping the resulting polymers.

The conjugated B-systems can be grafted (i.e. covalently bonded) to sulfonated lignin or a sulfonated polyflavonoids. While not wishing to be bound by theory, it is believed that this grafting results from the formation of radical species of the sulfonated polymers, which subsequently initiate aniline polymerization, and are thereby covalently incorporated into the resulting compositions of matter. It is believed that sulfonated polymers bearing aryl-hydroxy groups (e.g. lignin sulfonic acid and sulfonated polyflavonoids), are particularly likely to form grafted products.

Additionally, because the sulfonated lignin or sulfonated polyflavonoids are incorporated into the reaction product, the conducting polymers incorporated in the coatings of the invention possess advantageous properties over other conductive compositions of matter. For example, the conductive polymers of the invention comprising polyaniline chains grafted to sulfonated lignin or sulfonated polyflavonoids are highly cross-linkable due to the presence of the sulfonated lignin or sulfonated polyflavonoids, which are substituted with a variety of functional groups. The cross-linkability of the conductive polymers make them especially useful to prepare corrosion resistive coatings for metals.

The present invention is directed to coating systems utilizing at least one inherently conductive polymer dispersed in a film-forming resin base, where the conductive polymer comprises (1) linearly conjugated B-systems and (2) residues of sulfonated lignin or a sulfonated polyflavonoid, or a derivative of sulfonated lignin or sulfonated polyflavonoid.

The preferred conductive polymer for use in each of the systems is polyaniline doped with lignosulfonic acid. Another preferred conductive polymer is polyalanine doped with a sulfonated polyflavonoid, such as sulfonated tannins.

To improve adhesion of the coatings to the metal surface, the surface can be prepared prior to application of the coating compositions. A blast cabinet or similar means may be utilized for mechanical surface preparation. Other suitable methods of surface preparation known in the art may be used. These include sanding the surface with abrasive paper or chemical means such as deoxidizing baths. Another preferred method comprises lightly blasting the substrate with aluminum oxide grit.

The coatings of the invention should be cured to form a long-lasting coating. Curing refers to the polymerization and cross-linking of monomers, oligomers, and polymers to form a cross-linked polymer network, usually a solid film. Curing generally can be accomplished by any suitable method, e.g., with the help of an added curing agent, such as a sulfonamide, anhydride, or photoinitiator. Some resins also intrinsically cure, such as a mixture of an acrylic resin and a formaldehyde-based resin. The term "formaldehyde-based resin" is well known and understood in the art, and includes melamine-formaldehyde resin, phenol-formaldehyde resin, urea-formaldehyde resin, tannin-formaldehyde resin, and lignin-formaldehyde resin.

The term "film-forming resin" is understood in the art. A film-forming resin is a resin capable of forming a continuous polymer network in a thin film when spread on a surface. The films of the invention may be any thickness that provides protection against corrosion. Preferred thicknesses after drying are in the range of about 0.1 to about 20 mils. Especially preferred thicknesses are in the range of 1–10 mils. Suitable film-forming resins include polyurethanes, epoxies, neutral resins, acidic resins, acrylics, polyesters, glycidyl acrylates, polyamides, polyimides, polyaramids, polycarbonates, polymethyl methacrylates, poly(amide-imides), polyvinyl fluorides, urea-formaldehyde, phenol-formaldehyde, melamine-formaldehyde and combinations thereof.

The film-forming resins can be in the range of 10% to 99.9% by volume of the coating compositions, preferably in the range of 30% to 99% by volume of the coating compositions.

The resins of the invention can be water-borne or organic solvent-borne.

Water-borne resins are resins that are soluble or dispersible in water. Organic solvent-borne resins are resins that are soluble or dispersible in organic solvents.

The conductive polymers can be in the range of 0.01% to 90% by volume of the coating compositions. Preferably they are in the range of 0.1% to 10% of the coating composition. In a preferred embodiment, they are 0.7% by volume of the coating composition.

The coating systems of the present invention may be formulated in any way known in the art. Among the ways coating systems are formulated are as high solids systems, radiation curable systems, and powder coat systems.

For the purposes of the present invention, "High Solids" means an ambient temperature curable coating that complies with the Los Angeles County Rule 66 definition, i.e. 80% non-volatiles by volume or greater. "Radiation Curable" involves the polymerization and crosslinking of functional monomers and oligomers into a crosslinked polymer network (usually a solid film) induced by photons (UV curing) or electrons (EB curing). The curing can occur by either free radical or cationic polymerization. Infrared and beta radiation can also be utilized as energy sources for some radiation cure processes. "Powder Coating" involves coating objects with electrostatically sprayed, thermally sprayed, or fluidized polymer powder under influence of thermal energy causing the fine powder to melt or crosslink around the object and upon cooling to produce a compact polymeric layer.

General formulations for the coating systems according the invention are set forth as follows:

Typical resins for high solid coatings include polyurethanes, epoxies, and neutral or acidic resins. UV radiation curable resins include acrylates, polyurethanes, epoxies, and polyester. Powder coat resins include epoxies, polyurethanes, polyesters, glycidyl acrylates, and hybrids or resin blends, such as polyester and epoxy. See, for example, Hawkins et al. (U.S. Pat. No. 5,976,419).

Typical plasticizers useful in forming films are sulfonamides and phosphate esters. Curing agents include sulfonamides, anhydride types, and photoinitiators (free radical or cationic type photoinitiators). Other additives suitable for use in some coating formulations of the invention are surfactants, catalysts, adhesion promoters, and solvent.

Examples of specific formulations for, and instructions for preparing high solids systems, a UV-radiation cure system, and a powder coat system are known in the art, and are disclosed, for example in Hawkins et al., U.S. Pat. No. 5,976,419. All three of those coating formulation systems can be used with water-borne or organic solvent-borne resins. The formulations disclosed in Hawkins et al. are suitable for use in the composition of the present invention.

Latexes are a type of coating formulation comprising emulsion polymers in a solvent. Typically the solvent used is water. Latex formulations typically include a surfactant, which helps to solubilize resin polymers and maintain separate polymer droplets and micelles in the emulsion. When dried above their respective class transition temperatures, emulsion polymers form a continuous polymer phase. When a substrate is coated with a latex and the latex is dried, the resultant structure has a polymer-coated surface. Preferred coating compositions of the present invention include latexes. Especially preferred compositions are water-based latexes.

The invention will now be illustrated by the following non-limiting Examples, wherein unless otherwise stated: IR spectra were done as KBr pellets using a Perkin-Elmer 1600 FT-IR spectrometer; $^1$H-FT-NMR spectra were obtained using a Bruker AC-F 200 MHZ instrument; UV-Vis spectra were obtained using a Perkin-Elmer Lambda Array 3840 spectrophotometer; and conductivity was measured using a standard four-point probe method (Alessi).

EXAMPLES

Example 1

Preparation of ligno-pani. Ligno-pani was prepared by dissolving 1.00 g of sulfonated lignin, REAX 825E obtained from Westavco, in distilled water. This mixture was then passed through a column packed with Dowex 50WX840 strongly acidic cation exchange resin. The solution was then diluted to a volume of 34 ml with distilled water. A 1.00 ml aliquot of aniline was then added to the solution. The temperature was reduced to 0° C. while stirring. Then 1.92 g of sodium persulfate was added. The solution was stirred at 0° C. for 4 hrs. The solution was removed and centrifuged twice with washing by distilled water to remove all excess lignin and salt. The wet cake was then stored at 0° C. until use. Conductivity of the polymer was approximately 0.1 S/cm. Conductivity values were obtained for compressed pellets using an Alessi four-point conductivity probe. Greater conductivity values can be obtained by using a lower weight ratio of lignosulfonic acid to aniline (See Viswanathan, U.S. Pat. No. 5,968,417)

Coating Preparation. A series of water-based acrylic coatings were prepared. These coatings were prepared by mixing an acrylic resin obtained from McWhorter (Acrylimac WR 232-3312) with a melamine formaldehyde resin obtained from Monsanto (Resimene (HMM 747)). Ligno-pani was dispersed into this resin. The final composition contained 0.7% polymer. The coatings were applied to cold rolled steel (CRS) coupons purchased from Q-panel (SAE 1010 type QD). A spin coater was used to obtain a coating of uniform composition and thickness. The thicknesses of the coatings were measured using a screw caliper to be 1–2 mils.

Electrochemical studies. Cyclic voltammograms were obtained using a PAR 283 potentiostat with Power CV software. The experiments were performed in a 50 ml cell under inert atmosphere. Electrochemical corrosion measurements were performed using a PAR 283 potentiostat. Soft-CorrIII corrosion measurement software was used to generate Tafel plots, linear polarization curves, and cyclic polarization curves. A PAR 5210 lock-in amplifier was used with the potentiostat to perform electrochemical impedeance spectroscopy measurements. Electrochemistry Powersuite software was used to generate plots and manipulate the data. Coupons were tested in a conventional flat cell with a platinum counter electrode and a saturated calomel reference electrode. The electrolyte was 3.55% NaCl (w/v). The exposure area was 1 cm$^2$. Coupons were exposed on a sponge in a container filled with 3.55% NaCl. The solution was continually aerated to promote mixing and to prevent ion depletion.

Results and Discussion.

While HCl-doped polyaniline must be dispersed mechanically, which is impractical and inexpensive, ligno-pani disperses easily in coatings, including water-based coatings. Besides dispersibility, it is also important that the polymer is redox active at a value more positive than that of iron. FIG. 1 is a cyclic voltammogram that indicates that ligno-pani reduces at a value more favorable than that of iron, indicating the oxidation of the metal surface will occur spontaneously.

Figure 2:
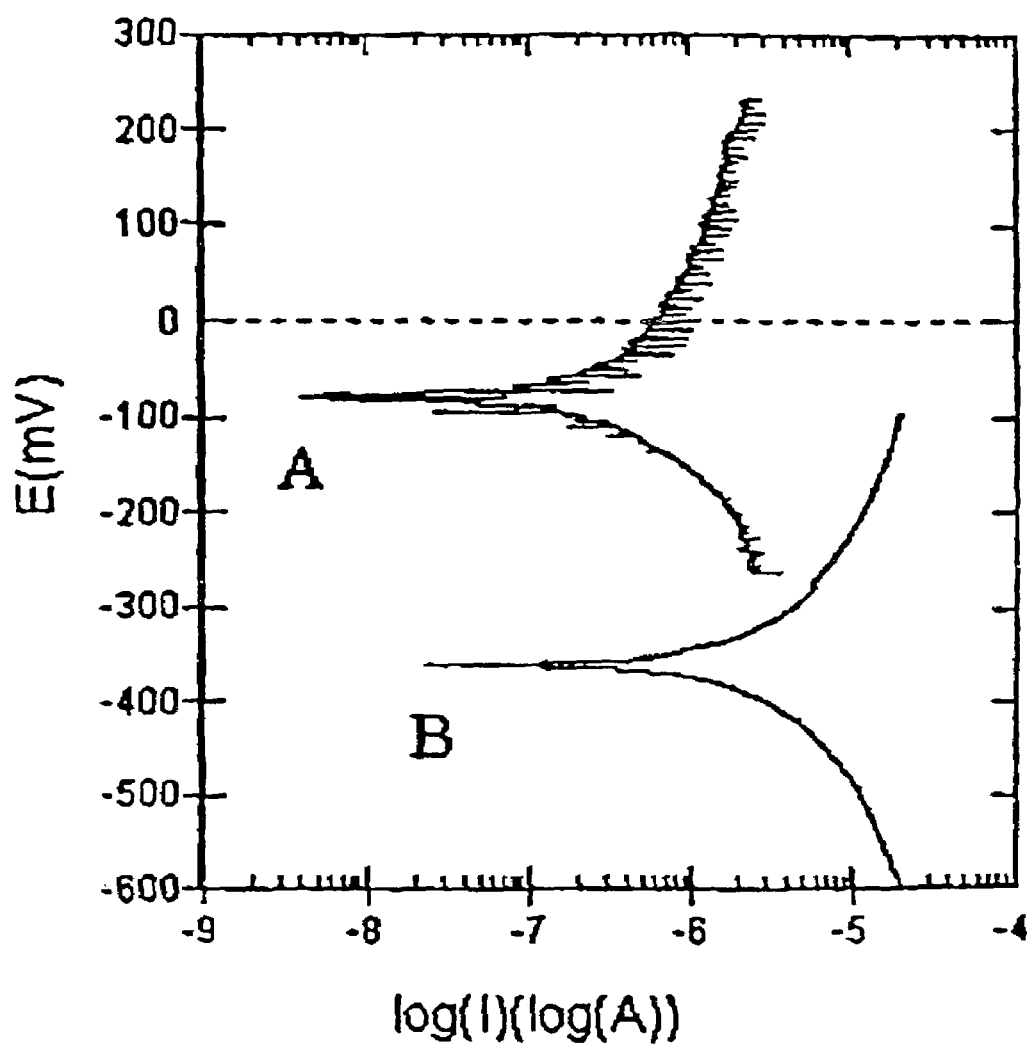
FIG. 2 shows Tafel plots (open circuit potential vs. the log of current), measuring corrosion, of cold rolled steel (CRS) coated with the acrylic resin containing ligno-pani (A) and of CRS coated with only the acrylic resin (B).

The steel coupons were tested inititially, and at intervals over a period of 20 days or more. This allowed sufficient time for the corrosion rate to reach equilibrium. The results show that ligno-pani passivates the metal surface. The plates containing the ICP show a more noble, i.e., more positive, open circuit potential (OCP). FIG. 2 shows the Tafel plots of the steel coated with the acrylic resin containing ligno-pani (A) and the steel coated with only the acrylic resin (B). The ICP coated steel has not only been shifted to a higher OCP, but to a lower corrosion current, which translates into a lower corrosion rate. The corrosion rate for A was 0.2296 mils per year (mpy), while B had a corrosion rate of 4.450 mpy. This lower corrosion rate indicates that the passive oxide layer is probably mediating the electron transfer between the electrolyte and the metal.

Conclusions

Ligno-pani is useful as a corrosion preventing agent. Ligno-pani is inexpensive, easily processed, easily applied, and performs well. The processability of ligno-pani is enhanced due to its water dispersibility. The extent of corrosion prevention has also been demonstrated to be significant.

Example 2

Electrochemical Impedance Spectroscopy (EIS) was used to investigate the corrosion-inhibiting properties of a ligno-pani-based coating on aluminum alloys under immersion in aerated 3.55% NaCl in water. The coating was prepared by mixing water-soluble ligno-pani with a high solids methoxymethylated melamine formaldehyde resin in a 1:2 ratio. The alloys used were aluminum 2024, 6061, and 7075.

Corrosion potential and EIS measurements were gathered on the test specimens avera 1-week immersion period each. Nyquist as well as Bode plots of the data were obtained. The ligno-pani-coated alloys showed large fluctuations in the corrosion potential during the first 24 hours of immersion that later subsided and approached a steadier change. The EIS spectra of the ligno-pani-coated alloys were characterized by an impedance that is higher than the impedance of the bare alloy. Changes in the EIS spectra were similar for ligno-pani-coated aluminum alloys 2024 and 7075. There was a decrease in the rate of corrosion of these alloys during the first 24 hours of immersion followed by an increase. The rate of corrosion of ligno-pani-coated aluminum 6061 did not show the initial decrease. The rate of corrosion of bare aluminum 2024 decreased with immersion time. The low frequency impedance (0.05 hertz), $Z_{lf}$, for the ligno-pani-coated alloys decreased with immersion time. Visible signs of coating failure (in the form of blisters) developed on aluminum alloys 2024 and 7075.

One advantage of the present invention is that the conducting polymers of the invention are more dispersible in water and polar solvents than the conducting polymers of the prior art. This allows them to be incorporated in latex or water-based coatings, and allows for better dispersion of the polymers in organic solvent-based coatings.

Another advantage of the present invention is that the conductive polymers in the coatings can be oxidized by air, obviating the need for including a consumable oxidant, such as the heavy metal cations used in Clough, T. J. (U.S. Pat. No. 5,656,070), in the coating composition.

Another advantage of the present invention is that the coating can be applied by most conventional methods for application, including dipping, brushing, rolling, spraying, fluidized bed, electrostatic powder, and thermally sprayed powder. Still another advantage of the present invention is the reduction or elimination of the emission of volatile organic compounds into the atmosphere. Another advantage is the elimination of the rinsing processes associated with galvanizing and plating operations, surface preparation for top-coating, and subsequent waste water treatment. Another advantage is the reduction of the levels of zinc, lead, cadmium, and other heavy metals in water systems and soil due to weathering of galvanized and plated structures. Another advantage of the present invention is the cost effectiveness of the process. The coating may be produced at a reasonable cost and applied with existing application systems. Use of the inventive coating system will extend service life and reduce the costs associated with corrosion maintenance. Still other benefits and advantages of the invention will become apparent to those skilled in the art to which it pertains upon a reading and understanding of the following detailed specification.

All publications, patents, and patent documents are incorporated by reference herein, as though individually incorporated by reference. The invention has been described with reference to various specific and preferred embodiments and techniques. It should be understood, however, that many variations and modifications may be made while remaining within the spirit and scope of the invention.

What is claimed is:

1. A water-based coating comprising: (a) polyanilines, (b) residues of sulfonated lignin or derivatives of sulfonated lignin; and (c) a film-forming resin.

2. The composition of claim 1 wherein the polyaniline is grafted to the residues.

3. The composition of claim 1 wherein the film-forming resin comprises an acrylic resin and a melamine formaldehyde resin.

4. The composition of claim 1 wherein the film-forming resin is a water-borne resin.

5. The composition of claim 1 wherein the film-forming resin is an organic-solvent-borne resin.

6. A composition for coating a metal, comprising: (a) polyanilines, (b) residues of sulfonated lignin or a sulfonated or derivatives of sulfonated lignin; and (c) a film-forming resin.

7. The composition of claim 6 wherein the film-forming resin comprises an acrylic resin.

8. The composition of claim 6 wherein the film-forming resin comprises an acrylic resin and a melamine formaldehyde resin.

9. The composition of claim 6 wherein the polyaniline is grafted to the residues.

10. The composition of claim 6 wherein the film-forming resin comprises an acrylic resin and a melamine formaldehyde resin.

11. The composition of claim 6 wherein the film-forming resin is a water-borne resin.

12. The composition of claim 6 wherein the film-forming resin is an organic-solvent-borne resin.

* * * * *